United States Patent
Chiang et al.

(10) Patent No.: US 9,367,728 B2
(45) Date of Patent: Jun. 14, 2016

(54) FINGERPRINT RECOGNITION METHOD AND DEVICE THEREOF

(71) Applicant: EGIS TECHNOLOGY INC., Taipei (TW)

(72) Inventors: Yuan-Lin Chiang, Taipei (TW); Yu-Chun Cheng, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 0 days.

(21) Appl. No.: 14/561,878

(22) Filed: Dec. 5, 2014

(65) Prior Publication Data

US 2016/0034744 A1 Feb. 4, 2016

Related U.S. Application Data

(60) Provisional application No. 61/912,265, filed on Dec. 5, 2013.

(51) Int. Cl.
G06K 9/00 (2006.01)

(52) U.S. Cl.
CPC .................... G06K 9/00073 (2013.01)

(58) Field of Classification Search
CPC ............................ G06K 9/00073; G06K 9/00
USPC ........................................................ 382/125
See application file for complete search history.

(56) References Cited

U.S. PATENT DOCUMENTS

| | | | |
|---|---|---|---|
| 2004/0101173 A1* | 5/2004 | Hara | G06K 9/00087 382/124 |
| 2007/0036401 A1 | 2/2007 | Hara | |
| 2007/0292008 A1* | 12/2007 | Yumoto | G06K 9/00087 382/124 |

FOREIGN PATENT DOCUMENTS

| | | |
|---|---|---|
| CN | 1664847 A | 9/2005 |
| CN | 101414351 A | 4/2009 |
| CN | 101620677 A | 1/2010 |
| TW | 200743039 | 11/2007 |

* cited by examiner

Primary Examiner — Ruiping Li
(74) Attorney, Agent, or Firm — Muncy, Geissler, Olds & Lowe, P.C.

(57) ABSTRACT

A fingerprint recognition method includes the following steps: obtaining a to-be-recognized fingerprint image of a to-be-recognized finger; extracting to-be-recognized data of the to-be-recognized fingerprint image, the to-be-recognized data including a to-be-recognized minutiae data set and a to-be-recognized skeleton; loading a minutiae-skeleton array of a registered finger, the minutiae-skeleton array including a plurality of elements, each of the plurality of elements including a registered minutiae data set and a registered skeleton; performing minutiae-skeleton verification on the to-be-recognized data and the minutiae-skeleton array to generate a verification result.

22 Claims, 11 Drawing Sheets (A)

(B)

(C)

(D)

FINGERPRINT RECOGNITION METHOD AND DEVICE THEREOF

CROSS-REFERENCE TO RELATED APPLICATION

This application claims the priority benefit from U.S. provisional Application No. 61/912,265, filed on Dec. 5, 2013, the disclosure of which is incorporated herein in its entirety by reference.

BACKGROUND OF THE INVENTION

1. Field of the Invention

The present invention relates to a fingerprint recognition method and device thereof, in particular with respect to a fingerprint recognition method and device thereof which performs fingerprint verification by using a merged minutiae data set and a minutiae-skeleton array.

2. Description of the Related Art

In order to meet the demand of personal identification recognition, recently, many biometrics recognition methods such as fingerprint recognition, retina recognition, face recognition, voice recognition and so on have been developed. The fingerprint recognition method is widely applied to various consumer electronic products, such as notebooks, smartphones, personal digital assistants, computer peripherals and so on, due to the convenience provided thereby.

Generally speaking, the fingerprint recognition method can be minutiae verification and image verification. Minutiae verification depicts fingerprint features by characteristic points of a fingerprint, namely, characteristics of the ridge endings (or end-points), bifurcations (or branches) and so on, and has the advantage of being in compliance with International Standard Organization and American Standards Association. Nonetheless, it is still subject to the issue of lower reliability in terms of smaller area fingerprint verification which obtains fingerprint information using a fingerprint sensor with a smaller sensing area. As to image verification, the similarity of the patterns in fingerprint images is used as the base to perform verification, which achieves the advantage of lower rejection rate. However, the original fingerprint images have to be stored, and therefore, larger storage space is needed. Also, the risk of the fingerprint images theft is therefore raised. In the meanwhile, as greater computation load is necessitated, errors may occur easily while rotating the fingerprints to match the patterns.

Regarding the smaller area fingerprint sensor, because the sensing area thereof is smaller than a complete fingerprint image, a plurality of partial fingerprint images hence have to be captured in order to obtain sufficient information during fingerprint enrollment, so as to establish a fingerprint template for performing fingerprint verification. Nonetheless, compared with the traditional fingerprint sensor which is capable of capturing a complete fingerprint image, the smaller area fingerprint sensor has smaller volume, and it is thus feasible to be applied to the thinner electronic devices developed in these days. As a result, how to promote the verification reliability of the smaller area fingerprint sensor has become a to-be-solved problem.

SUMMARY OF THE INVENTION

According to the aforementioned technical problems, the present invention provides a fingerprint recognition method and device thereof using merged minutiae verification and minutiae-skeleton verification which is applicable to smaller area fingerprint sensors to provide feasible false acceptance rate as well as false rejection rate while no original fingerprint images (i.e., raw images) have to be stored.

According to the objective of the present invention, a fingerprint recognition method is provided, which may comprise the following steps: (a) obtaining a to-be-recognized fingerprint image of a to-be-recognized finger; (b) extracting to-be-recognized data of the to-be-recognized fingerprint image, the to-be-recognized data including a to-be-recognized minutiae data set and a to-be-recognized skeleton; (c) loading a minutiae-skeleton array of a registered finger, the minutiae-skeleton array including a plurality of elements, each of the plurality of elements including a registered minutiae data set and a registered skeleton; and (d) performing minutiae-skeleton verification on the to-be-recognized data set and the minutiae-skeleton array to generate a verification result.

According to the objective of the present invention, a fingerprint recognition device is further provided, which may comprise: a fingerprint sensor; a control processor electrically coupled to the fingerprint sensor, and a storage electrically coupled the control processor, wherein, the control processor may be used to execute the following steps: (a) obtaining a to-be-recognized fingerprint image of a to-be-recognized finger; (b) extracting to-be-recognized data of the to-be-recognized fingerprint image, the to-be-recognized data including a to-be-recognized minutiae data set and a to-be-recognized skeleton; (c) loading a minutiae-skeleton array of a registered finger, the minutiae-skeleton array including a plurality of elements, each of the plurality of elements including a registered minutiae data set and a registered skeleton; and (d) performing minutiae-skeleton verification on the to-be-recognized data and the minutiae-skeleton array to generate a verification result.

According to the preceding description, a fingerprint recognition method and a device thereof of the present invention may have one or more following advantages:

(1) A plurality of minutiae data sets are merged to form a merged minutiae data set to increase the credibility and reliability of the data for representing a registered fingerprint.

(2) A plurality of minutiae data sets and skeletons are combined to form a minutiae-skeleton array to decrease the false rejection rate for fingerprint verification.

(3) The present invention is applicable to fingerprint verification, and preferably, applicable to fingerprints verification with small sensing areas, the data needed to be stored is decreased since no original fingerprint images are required during verification.

(4) A learning mechanism is provided which is capable of modifying and updating the minutiae-skeleton array according to the to-be-recognized data so as to accelerate verification or to increase the coverage of the minutiae-skeleton array.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention. The exemplary embodiments of the present invention will be understood more fully from the detailed description given below and from the accompanying drawings of various embodiments of the invention, which, however, should not be taken to limit the invention to the specific embodiments, but are for explanation and understanding only.

Figure 1:
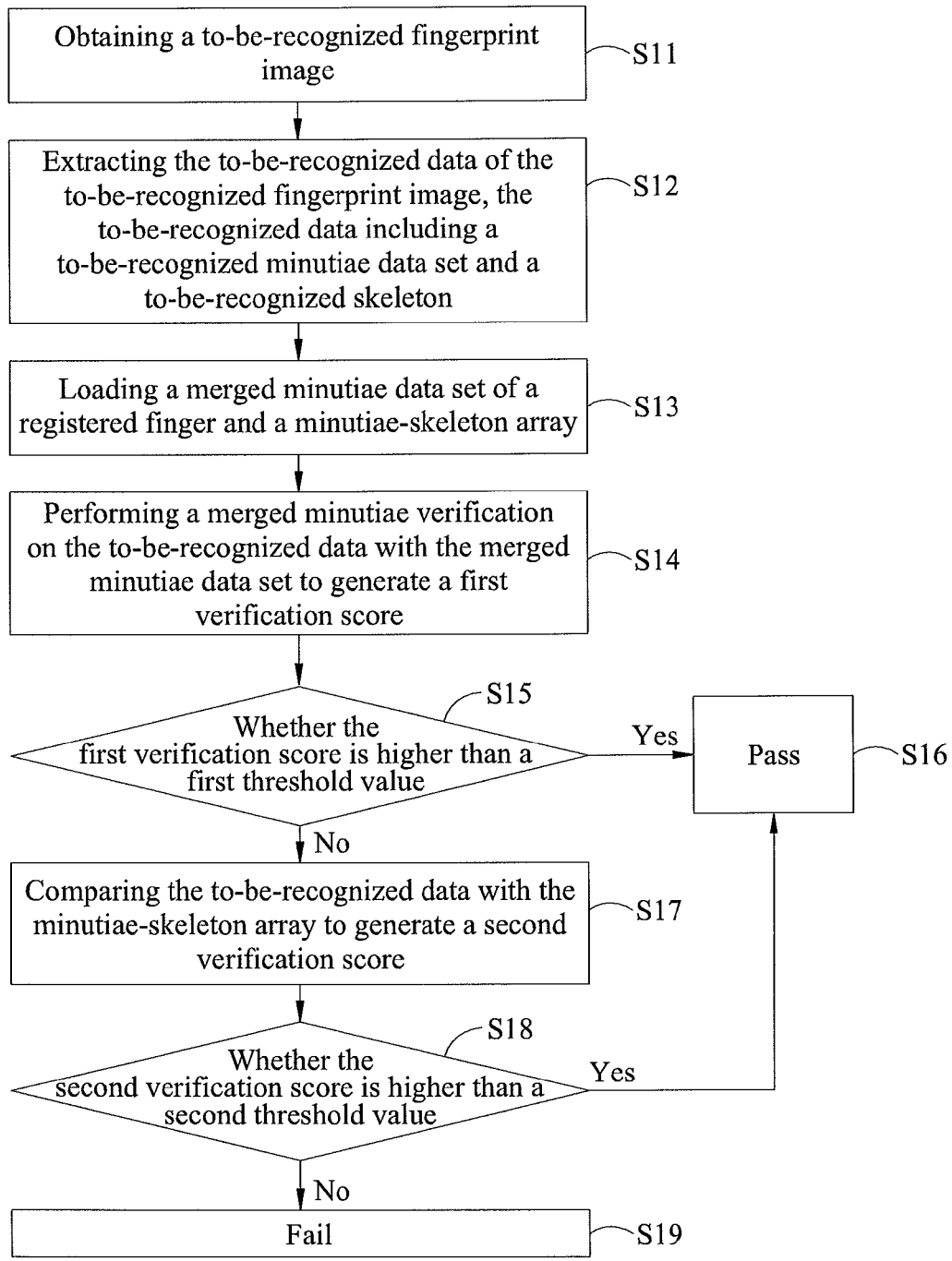
FIG. 1 is a flow chart of a fingerprint recognition method according to an embodiment of the present invention.

FIG. 1 is a flow chart of a fingerprint recognition method according to an embodiment of the present invention. In step S11 of the fingerprint recognition method of the present invention, a to-be-recognized fingerprint image of a to-be-recognized finger is obtained, and then in step S12, the to-be-recognized data is extracted from the to-be-recognized fingerprint image. The to-be-recognized data may include a to-be-recognized minutiae data set and a to-be-recognized skeleton. Where the to-be-recognized minutiae data set includes the minutiae information of the to-be-recognized fingerprint image, and the to-be-recognized skeleton is a skeletonized image formed by skeletonizing the to-be-recognized fingerprint image. After the to-be-recognized data is extracted in step S12, the registered data of a registered finger is loaded in step S13 for performing the verification. The registered data may include a merged minutiae data set and a minutiae-skeleton array. Here, the merged minutiae data set may be a merged-map of a plurality of minutiae data sets, and the minutiae-skeleton array may also be called as "minutiae-skeleton hybrid array." In step S14, the merged minutiae verification is performed among the to-be-recognized minutiae data set extracted from the to-be-recognized fingerprint image and the merged minutiae data set of the registered finger, and a first verification score is generated. The merged minutiae verification herein may also be called "minutiae matching". Subsequently, it is determined in step S15 that whether the first verification score is higher than a first threshold value. If the first verification score is higher than the first threshold value, the to-be-recognized data pass the merged minutiae verification, and subsequently the method enters step S16, in which the to-be-recognized fingerprint image is determined as passing the verification. If the first verification score is lower than the first threshold value, it means that the to-be-recognized data fails to pass the merged minutiae verification, and step S17 is then performed. In step S17, the method uses the to-be-recognized data extracted from the to-be-recognized fingerprint image, namely the to-be-recognized minutiae data set and the to-be-recognized skeleton, and the minutiae-skeleton array of the registered finger to perform the minutiae-skeleton verification to generate a second verification score. The method determines whether the second verification score is higher than a second threshold value in step S18. If the second verification score is higher than the second threshold value, it means that the to-be-recognized data passes the minutiae-skeleton verification and the method enters step S16, in which the to-be-recognized fingerprint image is determined as passing the verification. As explained above, the method defines the to-be-recognized fingerprint image passes the verification either if the first verification score is higher than the first threshold value, or if the second verification score is higher than the second threshold value. On the other hand, if the second verification score is lower than the second threshold value, it means that the to-be-recognized fingerprint image fails to pass the minutiae-skeleton verification, as indicated in step S19.

Briefly speaking, a fingerprint recognition method of the present invention is firstly to perform the merged minutiae verification. If the to-be-recognized fingerprint image passes the merged minutiae verification, no further follow-up steps have to be performed. If the to-be-recognized fingerprint image fails to pass the merged minutiae verification, the method then performs the minutiae-skeleton verification so as to increase the accuracy rate of the verification result in whole. It is noteworthy that the merged minutiae verification is one-to-one verification between the to-be-recognized minutiae data set of the to-be-recognized finger and the merged minutiae data set of the registered finger. On the other hand, the minutiae-skeleton verification is one-to-many verification of the to-be-recognized data of the to-be-recognized finger (including the to-be-recognized minutiae data set and the to-be-recognized skeleton) and the minutiae-skeleton array of the registered finger (including a plurality of elements, and each element includes a registered minutiae data set and a registered skeleton). As a result, in the minutiae-skeleton verification, the to-be-recognized data will be compared with each of the elements of the minutiae-skeleton array in sequence, and when the second verification score of any of the verification results of the minutiae-skeleton verification is higher than the second threshold value, the to-be-recognized fingerprint image passes the verification. If the second verification scores of all of the verification results of the minutiae-skeleton verification are lower than the second threshold value, the to-be-recognized fingerprint image fails to pass the verification. It should be noted that passing the verification mentioned in the specification of the present invention means that the to-be-recognized fingerprint matches the registered finger. On the contrary, failing to pass the verification means that the to-be-recognized fingerprint does not match the registered finger.

Figure 2:
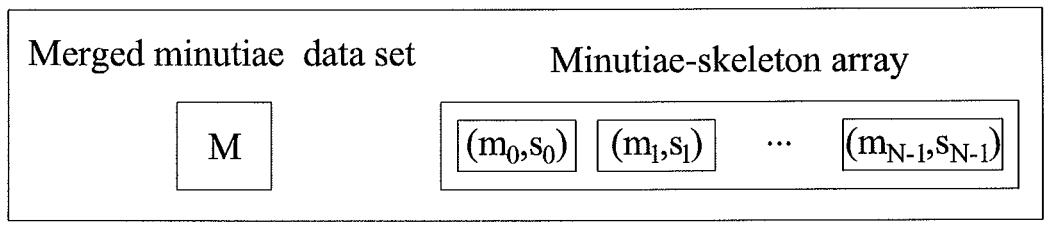
FIG. 2 is a schematic diagram of extracted data structure of a registered finger of a fingerprint recognition method according to an embodiment of the present invention.
Figure 3:
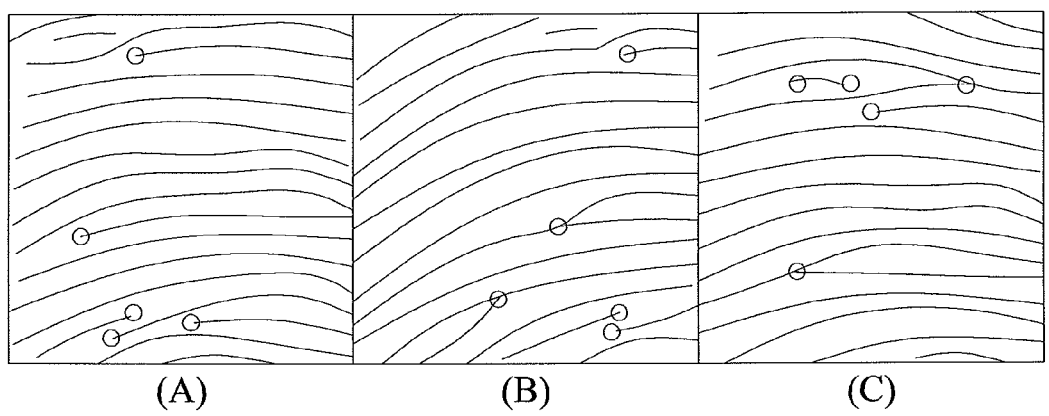
FIG. 3 is a schematic diagram of a minutiae-skeleton array of a fingerprint recognition method according to an embodiment of the present invention.
Figure 4:
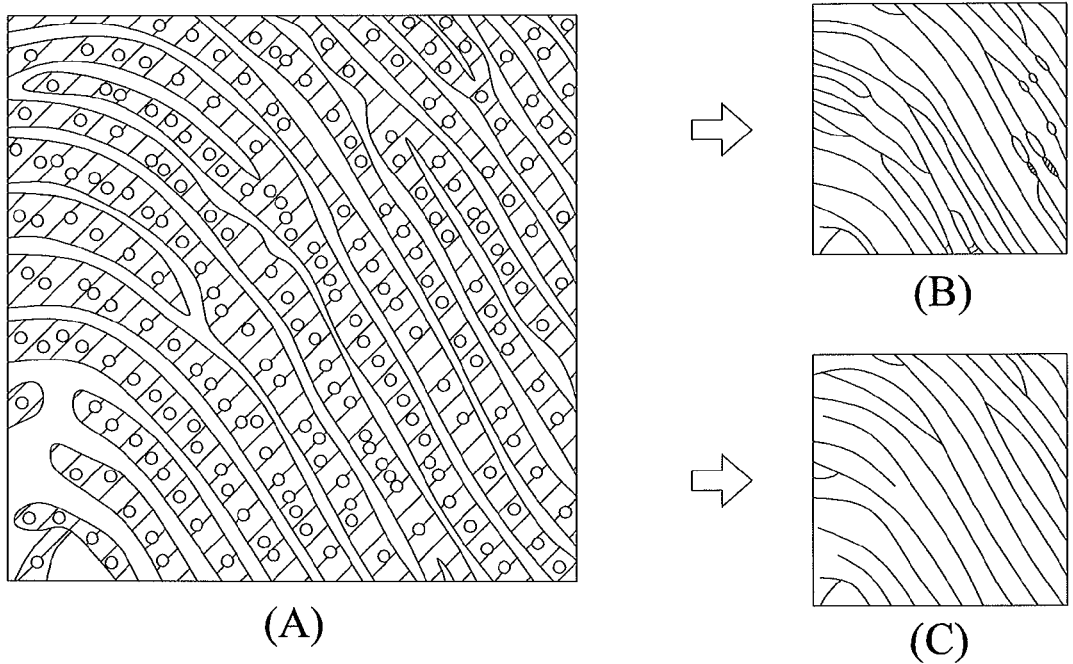
FIG. 4 is a schematic diagram of forming a skeleton for a fingerprint recognition method according to an embodiment of the present invention.
Figure 5:
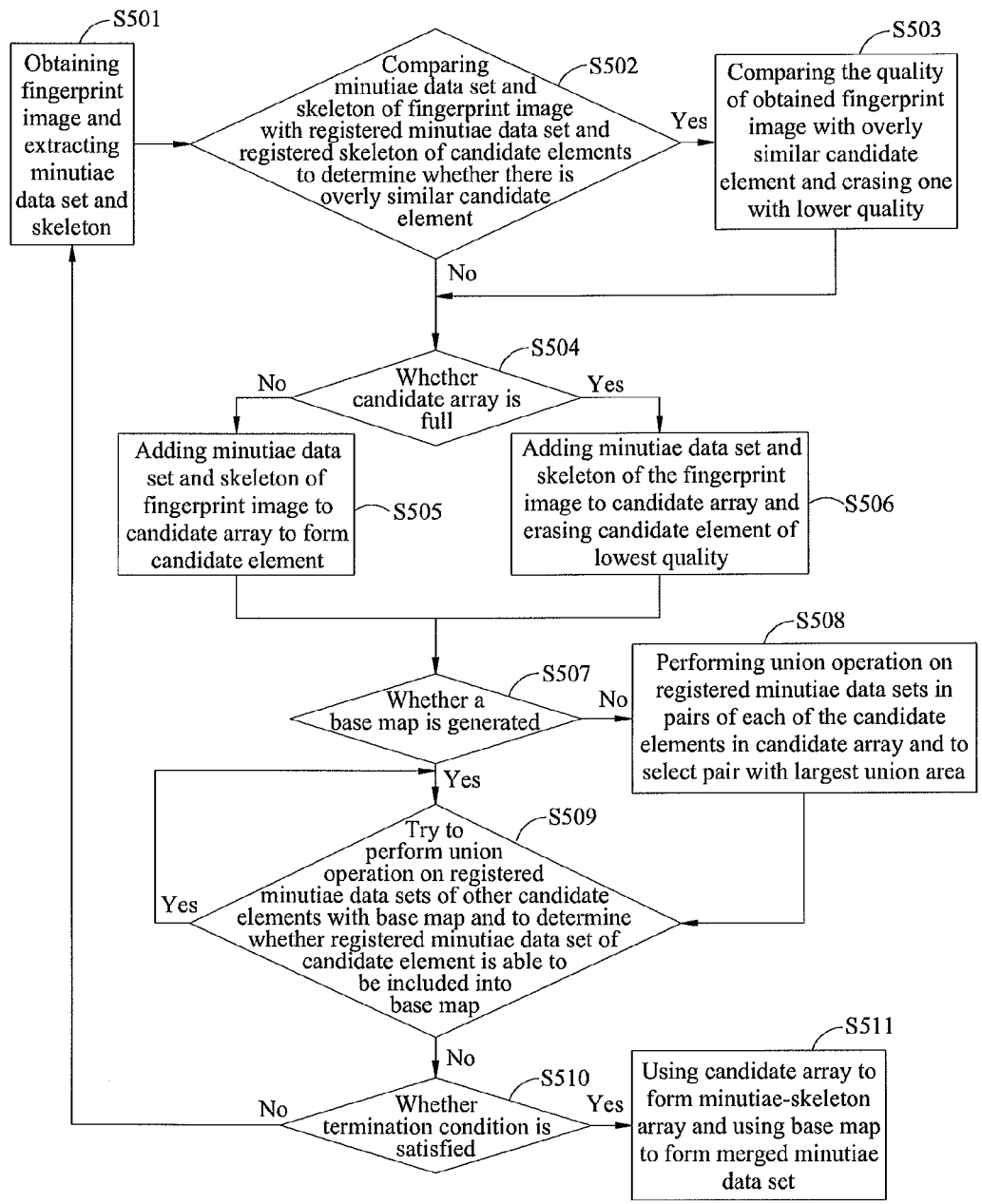
FIG. 5 is a flow chart of a fingerprint enrollment process for forming a minutiae-skeleton array and a merged minutiae data set for a fingerprint recognition method according to an embodiment of the present invention.

Please refer to FIG. 2 to FIG. 5, among which the method for generating the merged minutiae data set and the minutiae-skeleton array of the registered finger would be explained. FIG. 2 is a schematic diagram of the extracted data structure of a registered finger for a fingerprint recognition method according to an embodiment of the present invention. FIG. 3 is a schematic diagram of a minutiae-skeleton array for a fingerprint recognition method according to an embodiment of the present invention. FIG. 4 is a schematic diagram of forming a skeleton for a fingerprint recognition method according to an embodiment of the present invention. FIG. 5 is a flow chart of a fingerprint enrollment process for forming a minutiae-skeleton array and a merged minutiae data set for a fingerprint recognition method according to an embodiment of the present invention.

As FIG. 2 shows, the extracted data structure of a registered finger includes a merged minutiae data set M and a minutiae-skeleton array $(m_0, s_0), (m_1, s_1) \ldots (m_{N-1}, s_{N-1})$ comprising N elements. Each of the N elements of the minutiae-skeleton array may be presented as $(m_i, s_i)$, where $m_i$ is a registered minutiae data set and $s_i$ is a registered skeleton, and $0 \leq i < N$. The merged minutiae data set M may be the set comprising at least part of the plurality of the registered minutiae data sets $m_i$, and the method for generating the merged minutiae data set M will be explicitly explained hereinafter.

As FIG. 3 shows, the minutiae array shown in FIG. 3 (A), FIG. 3 (B) and FIG. 3 (C) comprises the registered minutiae data sets $m_0$, $m_1$ and $m_2$. The circles in FIG. 3 (A), FIG. 3 (B) and FIG. 3 (C) are the characteristic points of the fingerprint which may record the features of the branches or end-points of the fingerprint. Here, the characteristic may further include types, curvatures, and ridge density of the fingerprint. Attention is now directed to FIG. 4 (A) to 4 (C), in which FIG. 4 (A) is the fingerprint image, FIG. 4 (B) is the skeleton $s_i$ generated from the fingerprint image of FIG. 4 (A), and FIG. 4 (C) is the skeleton $s_i$ generated from and by preprocessing the fingerprint image of FIG. 4 (A). The process of preprocessing the fingerprint image comprises the steps of detecting the sweat pores and then erasing them so as to generate a better skeleton. The sweat pores are usually presented as white-colored points in the small range of the fingerprint image, rather than a continuous white-colored region. The fingerprint grooves are often shown as continuous white-colored regions and white-colored lines surrounded by black-colored regions. Consequently, the adjacent area can be smoothed and normalized to erase the sweat pores. By comparing FIG. 4 (B) and FIG. 4 (C), it can be seen that a better skeleton can be obtained through the preprocessing for erasing the sweat pores in the fingerprint image prior to forming the skeleton.

FIG. 5 is a flow chart of a fingerprint enrollment process for forming a minutiae-skeleton array and a merged minutiae data set according to an embodiment of the present invention.

As shown in the flow chart, the fingerprint enrollment process comprises the following steps. Firstly in step S501, a fingerprint image is obtained, and a minutiae data set and a skeleton of the fingerprint image are extracted therefrom. In step S502, the minutiae data set and the skeleton of the fingerprint image are compared with the registered minutiae data set and the registered skeleton of the candidate elements to determine whether there is an overly similar candidate element. "Overly similar" means that the obtained fingerprint image is substantially the same as the candidate element of the candidate array defining the registered fingerprint. If there is an overly similar candidate element, step S503 is entered to compare the quality of the obtained fingerprint image with the overly similar candidate element and the one with lower quality would be erased. Afterwards, step S504 is proceeded to determine whether the candidate array is full. If the candidate array is full, as indicated in step S506, the minutiae data set and the skeleton of the fingerprint image are added to the candidate array, and the candidate element of the lowest quality is erased. As an alternate, if the candidate array is not full, step S505 is entered to directly add the minutiae data set and the skeleton of the fingerprint image to the candidate array to form a candidate element comprising the registered minutiae data set and the registered skeleton.

Subsequently, step S507 is entered to determine whether a base map is generated. Here, the base map will be described in detail in the following step S508. If it is determined that the base map is not generated, step S508 is proceeded to perform union operation on the registered minutiae data sets in pairs of each of the candidate elements in the candidate array and to select the pair with the largest union area, i.e., with the greatest set of data. After the pair of the candidate elements with the largest union area is selected, the union of the pair of the registered minutiae data sets thereof is defined as the base map. Afterwards, step S509 is entered to try to perform union operation on the registered minutiae data sets of the other candidate elements with the base map. As an alternate, if it is determined that the base map is generated in step S507, step S509 is directly entered to try to include the registered minutiae data sets of the other candidate elements into the base map with union operation. When the registered minutiae data set of the candidate element is unable to be included into the base map, step S510 is entered to determine whether termination condition is satisfied. If the termination condition is satisfied, then the candidate array is used to form the minutiae-skeleton array and the base map is used to form the merged minutiae data set (Step S511). If it is not satisfied, step S501 is performed and the next fingerprint image is obtained. It is noteworthy that the termination condition is formed only when the following conditions are satisfied: first, the base map comprises the minutiae data sets of more than two fingerprint images, and second, the amount of the candidate elements comprised in the candidate array is higher than a preset number indicating the least amount of enrollments.

From FIG. 2 to FIG. 5, the merged minutiae data set and the minutiae-skeleton array of the registered finger may be formed through the following steps. Firstly, a fingerprint sensor is used to obtain n frames of fingerprint images of the registered finger, and then n records of the registered minutiae data sets of the n frames of the fingerprint images are extracted to form the minutiae array $(m_0, m_1 \ldots m_{N-1})$. Afterwards, the n frames of the fingerprint images are pre-processed to erase the sweat pores, and n registered skeletons $(s_0, s1 \ldots s_{N-1})$ are extracted to form the skeleton array. Finally, the minutiae array and the skeleton array are utilized to form the minutiae-skeleton array $(m_0, s_0), (m_1, s_1) \ldots (m_{N-1}, s_{N-1})$, and at least partial elements of the minutiae array are utilized to form the merged minutiae data set M.

Figure 6:
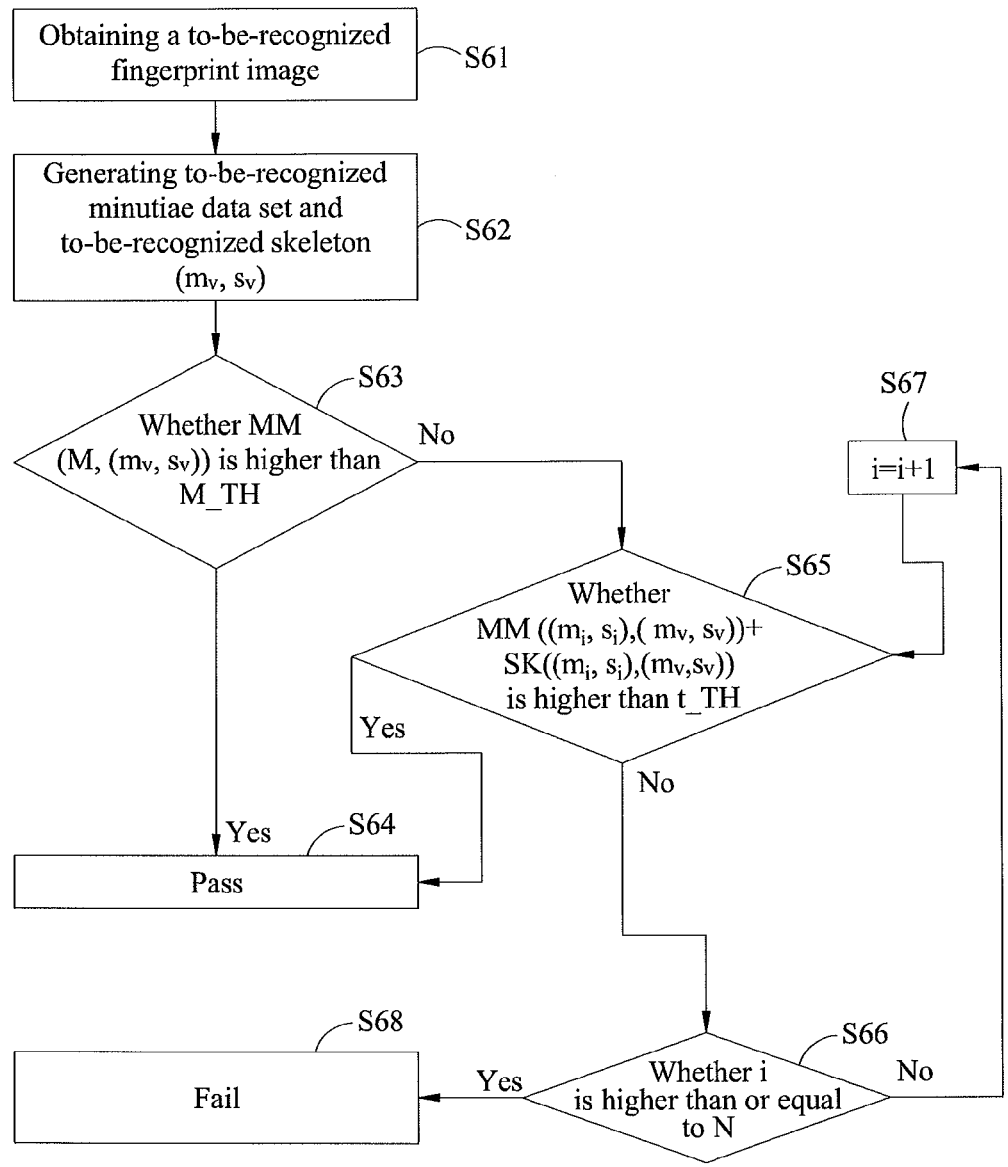
FIG. 6 is a verification flow chart of a fingerprint recognition method according to an embodiment of the present invention.

Hereinafter, a fingerprint verification method of the present invention will be explained in detail with reference to FIG. 6 to FIG. 10. FIG. 6 is a verification flow chart of a fingerprint recognition method according to an embodiment of the present invention.

Explanation of symbols: MM ( ) stands for a minutiae verification function which outputs a minutiae verification score. SK ( ) stands for a skeleton verification function which generates a skeleton verification score. M_TH is a first threshold value. t_TH is a second threshold value.

According to the verification procedure of the present invention, firstly, the to-be-recognized fingerprint image is obtained in step S61, and the to-be-recognized data $(m_v, s_v)$ of the to-be-recognized fingerprint image are formed, which comprise a to-be-recognized minutiae data set $m_v$ and a to-be-recognized skeleton $s_v$. Subsequently, the to-be-recognized minutiae data set $m_v$ and the merged minutiae data set M are employed to perform one-to-one minutiae verification, and a first verification score MM (M, $(m_v, s_v)$) is generated in step S63. If the first verification score is higher than the first threshold value M_TH, step S64 is entered, in which the to-be-recognized fingerprint image is determined as passing the verification. On the other hand, if the first verification score is not higher than the first threshold value M_TH, step S65 is entered to perform minutiae-skeleton verification. During the minutiae-skeleton verification, each of the elements ($m_i$, $s_i$) of the minutiae-skeleton array is utilized in sequence to compare with the to-be-recognized data ($m_v$, $s_v$) so as to respectively perform minutiae verification and the skeleton verification. The minutiae verification score is aggregated with the skeleton verification score to obtain the second verification score MM (($m_i$, $s_i$), ($m_v$, $s_v$))+SK(($m_i$, $s_i$), ($m_v$, $s_v$)). If the second verification score for any element of the minutiae-skeleton array is higher than the second threshold value t_TH, step S64 is entered, in which the to-be-recognized fingerprint image is determined as passing the verification. If all of the second verification scores for all of the elements in the minutiae-skeleton array (($m_i$, $s_i$), $0 <= i < N$) are smaller than the second threshold value, step S68 is entered, in which the to-be-recognized fingerprint image is determined as failing to pass the verification.

Figure 7:
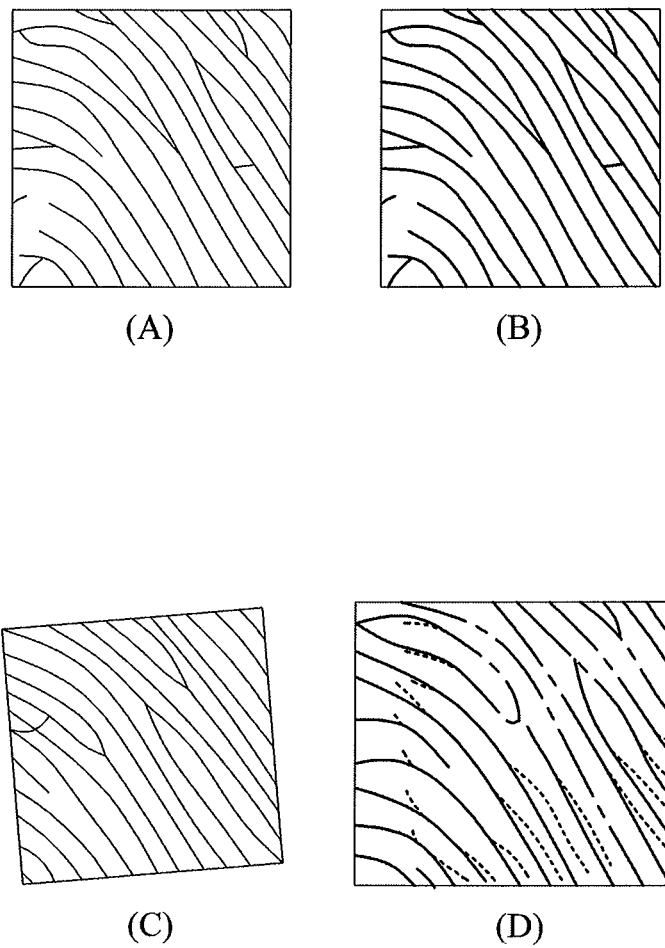
FIG. 7 is a schematic diagram of a dilation matching of a fingerprint recognition method according to an embodiment of the present invention.
Figure 8:
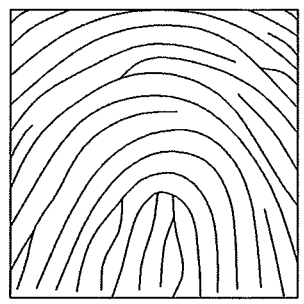
FIG. 8 is a XOR matching schematic diagram of a fingerprint recognition method according to an embodiment of the present invention.
Figure 8:
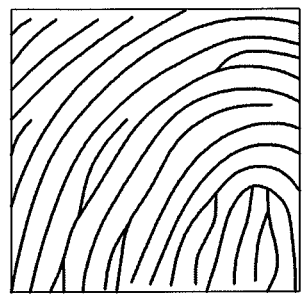
Figure 8:
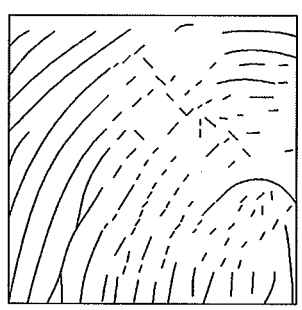
Figure 8:
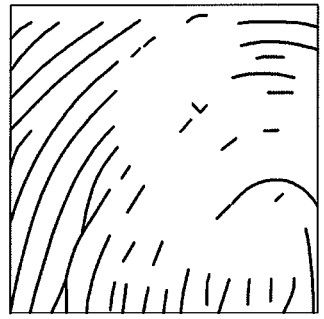

The skeleton verification of the present invention which employs dilation matching or XOR matching which will be explicitly explained in FIG. 7 and FIG. 8.

FIG. 7 is a schematic diagram of a dilation matching of a fingerprint recognition method according to an embodiment of the present invention. FIG. 7 (A) is the to-be-recognized skeleton $s_v$, and the to-be-recognized skeleton is dilated based on condition of density of the skeleton so as to generate the dilated image in FIG. 7 (B). Next, the dilated image is overlapped with the registered skeleton $s_i$ to form the overlaid image in FIG. 7 (D), and the number of the non-overlapping pixels is deducted from the number of the overlapping pixels so as to generate the skeleton verification score. It is noteworthy that the registered skeleton $s_i$ provides a certain level of rotation fault tolerance to increase the accuracy rate.

FIG. 8 is a XOR matching schematic diagram of a fingerprint recognition method according to an embodiment of the present invention. FIG. 8 (A) is the to-be-recognized skeleton $s_v$ and FIG. 8 (B) is the registered skeleton $s_i$. FIG. 8 (C) is a XOR diagram which performs XOR matching on the to-be-recognized skeleton $s_v$ in FIG. 8 (A) and the registered skeleton $s_i$ in FIG. 8 (B), that is, the to-be-recognized skeleton $s_v$ and the registered skeleton $s_i$ are overlapped and the overlapping part of the to-be-recognized skeleton $s_v$ and the registered skeleton $s_i$ are removed to generate the XOR diagram. FIG. 8 (D) is a XOR diagram without the noise where the noise is removed from the XOR diagram of FIG. 8 (C), that is, the noise-clean XOR image. Therefore, the skeleton verification score is obtained according to the ratio of the overlapping area (the removed part) to the skeleton, and the skeleton verification score is increased as the overlapping area (the removed part) of the skeleton increases. It is noteworthy that the registered skeleton $s_i$ provides a certain level of rotation fault tolerance to increase the accuracy rate.

In order to better understand the verification procedure, three examples thereof are provided herein according to the verification procedure in FIG. 6 and the dilation matching in FIG. 7. Example 1 demonstrates that the verification of the to-be-recognized data of the to-be-recognized finger passes in the process of the merged minutiae verification and the minutiae-skeleton verification is not performed. Example 2 demonstrates that the to-be-recognized data of the to-be-recognized finger fails to pass the merged minutiae verification. Therefore, the minutiae-skeleton verification is performed, and the second try of verification passes in the process of the minutiae-skeleton verification. Example 3 demonstrates that the verification of the to-be-recognized data of the to-be-recognized finger fails to pass the merged minutiae verification, thus the minutiae-skeleton verification is performed, and all of the three tries of verification are failed to pass in the process of the minutiae-skeleton verification. Here, MM ( ) is a minutiae verification function, the skeleton verification score SK ( )=(the number of the overlapping pixels in the overlaid image minus the number of the non-overlapping pixels in the overlaid image) multiply C1, and C1 is a preset constant.

Example 1

The to-be-recognized fingerprint image V1 is obtained, and the merged minutiae verification is performed on the to-be-recognized fingerprint image V1 with the registered finger R. The first verification score generated from the merged minutiae verification is higher than the first threshold value, therefore, the to-be-recognized fingerprint image V1 passes the verification.

(1) The first threshold value M_TH=70.
(2) The first verification score MM ($M_R$, ($m_{v1}$, $s_{v1}$))= 150>M_TH.
(3) The verification passes, and the first verification score is 150.

Example 2

Figure 9:
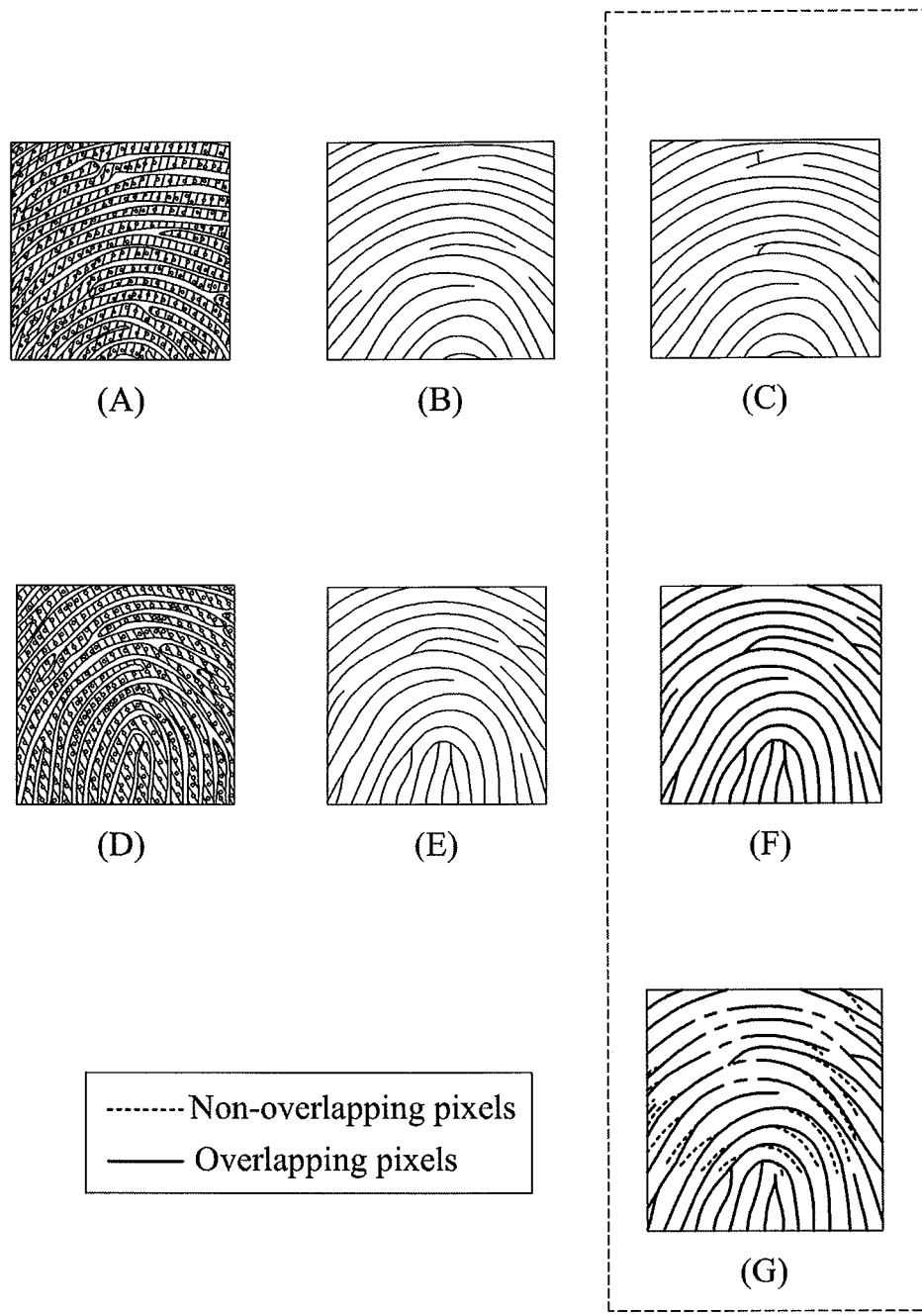
FIG. 9 is a schematic diagram of a second verification sample for a fingerprint recognition method according to an embodiment of the present invention.

The to-be-recognized fingerprint image V2 is obtained, and the to-be-recognized fingerprint image V2 fails to pass the merged minutiae verification. Then, the minutiae-skeleton verification is performed. The minutiae-skeleton array comprises three element; N=3. The second try of the minutiae-skeleton verification on the second element of the array passes the verification since the second verification score for the second element of the array is higher than the second threshold value. Here, Example 2 is explained with reference to FIG. 9 (A) to FIG. 9(C). FIG. 9 (A) is the registered fingerprint image, FIG. 9 (B) is the registered skeleton $S_{R2}$, FIG. 9 (C) is the registered skeleton $S_{R2}$ after rotation, FIG. 9 (D) is the to-be-recognized fingerprint image, FIG. 9 (E) is the to-be-recognized skeleton $S_{V2}$, FIG. 9 (F) is the dilated to-be-recognized skeleton $S_{V2}$, and FIG. 9 (G) is the overlaid image generated by overlaying the images in FIG. 9 (C) and FIG. 9 (F).

(1) The first threshold value M_TH=70, and the second threshold value t_TH=50.
(2) The first verification score MM ($M_R$, ($m_{v2}$, $s_{v2l}$))=30<M_TH.
(3) The second verification score (MM ($m_{R1}$, $s_{R1}$), ($m_{V2}$, $s_{V2}$))+SK (($m_{R1}$, $s_{R1}$), ($m_{V2}$, $s_{V2}$)))=30+10<t_TH.
(4) The second verification score (MM ($m_{R2}$, $s_{R2}$), ($m_{V2}$, $s_{V2}$))+SK (($m_{R2}$, $s_{R2}$), ($m_{V2}$, $s_{V2}$)))=10+50<t_TH.
(5) The verification passes, and the second verification score is 60.

Example 3

Figure 10:
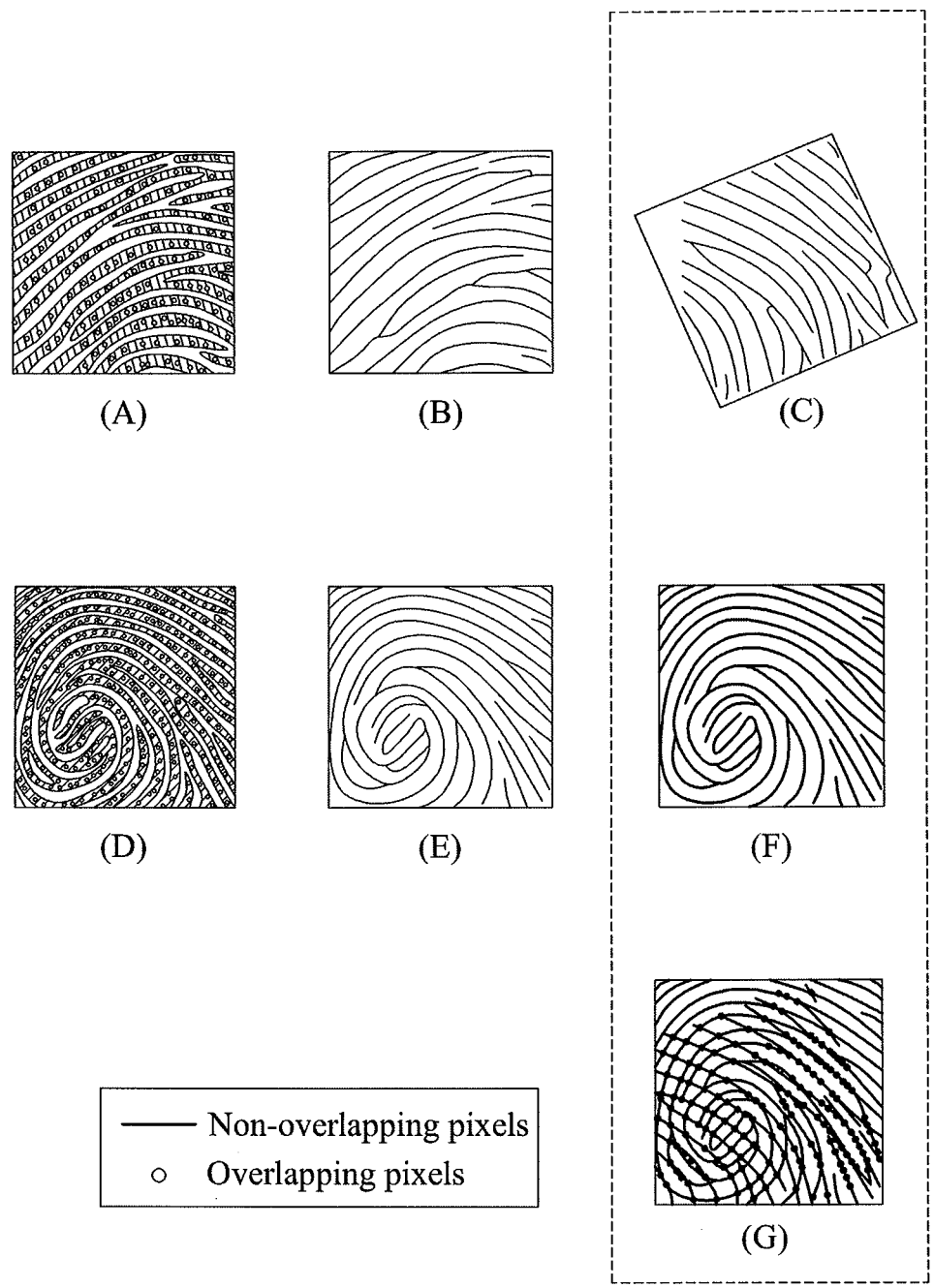
FIG. 10 is a schematic diagram of a third verification sample for a fingerprint recognition method according to an embodiment of the present invention.

The to-be-recognized fingerprint image V3 is obtained, which fails to pass the merged minutiae verification performed with the registered finger R, and all of the second verification scores generated from the three tries of the minutiae-skeleton verification N=3 are smaller than the second threshold value, which means the to-be-recognized fingerprint image V3 fails to pass the verification. Here, Example 3 is explained with reference to FIG. 10 (A) to FIG. 10(G). FIG. 10 (A) is the registered fingerprint image, FIG. 10 (B) is the registered skeleton $S_{R3}$, FIG. 10 (C) is the registered skeleton $S_{R3}$ after rotation, FIG. 10 (D) is the to-be-recognized fingerprint image, FIG. 10 (E) is the to-be-recognized skeleton $S_{V3}$, FIG. 10 (F) is the dilated to-be-recognized skeleton $S_{V3}$, and FIG. 10 (G) is the overlaid image generated by overlaying the images in FIG. 10 (C) and FIG. 10 (F).

(1) The first threshold value M_TH=70, and the second threshold value t_TH=50.

(2) The first verification score MM ($M_R$, ($m_{v3}$, $s_{v3}$))=30<M_TH.

(3) The second verification score (MM ($m_{R1}$, $s_{R1}$), ($m_{V3}$, $s_{V3}$))+SK (($m_{R1}$, $s_{R1}$), ($m_{V3}$, $s_{V3}$)))=30−10<t_TH.

(4) The second verification score (MM ($m_{R2}$, $s_{R2}$), ($m_{V3}$, $s_{V3}$))+SK (($m_{R2}$, $s_{R2}$), ($m_{V3}$, $s_{V3}$)))=30−10<t_TH.

(5) The second verification score (MM ($m_{R3}$, $s_{R3}$), ($m_{V3}$, $s_{V3}$))+SK (($m_{R3}$, $s_{R3}$), ($m_{V3}$, $s_{V3}$)))=30−40<t_TH.

(6) All of the second verification scores are smaller than the second threshold value, and the verification fails.

A fingerprint recognition method of the present invention may further comprise a learning mechanism, comprising:

(1) re-ordering the elements of the minutiae-skeleton array, and predicting the user's habit to accelerate the verification.

(2) replacing and updating the elements of the minutiae-skeleton array to increase the coverage and scope of the minutiae-skeleton array.

Hereinafter, the learning mechanism of the present invention will be explained in details with reference to FIG. 2. In the learning mechanism, the minutiae-skeleton array is re-ordered or the elements of the array are replaced with the to-be-recognized data according to the fingerprint verification result so as to accelerate the verification process and/or to increase the coverage and scope of the minutiae-skeleton array.

In the learning mechanism of re-ordering the elements of the minutiae-skeleton array, the elements of the array corresponding to the parts of the fingerprint with high possibility of being re-input due to the authorized user's habit of placing finger on the fingerprint sensor will be placed in the front portion of the array so as to accelerate the verification process because the minutiae-skeleton verification is performed on the elements of the array in sequence from the front to back portion of the minutiae-skeleton array. The following is a simple example: provided that in the minutiae-skeleton array with three elements (N=3), the rates of successful verification for the elements ($m_1$, $s_1$), ($m_2$, $s_2$) and ($m_0$, $s_0$) are respectively 50%, 30% and 10% (the 10% indicates that the verification fails) due to the user's habit of placing finger on the fingerprint sensor. Therefore, the original order of the minutiae-skeleton array, which is ($m_0$, $s_0$), ($m_1$, $s_1$) and ($m_2$, $s_2$), is reordered and changed to be ($m_1$, $s_1$), ($m_2$, $s_2$) and ($m_0$, $s_0$) so as to accelerate the fingerprint verification process.

In the learning mechanism of replacing elements of the minutiae-skeleton array, when the elements of the minutiae-skeleton array have higher diversity, which means that the elements are less similar with each other, the coverage of the array is broader, which means the array covers and corresponds to larger area of the fingerprint of the authorized user. Therefore, the false rejection rate will be decreased since the successful rate of verification for the to-be-recognized fingerprint image of the authorized user will be increased. The following is a simple example: originally, the minutiae-skeleton array comprises three elements ($m_0$, $s_0$), ($m_1$, $s_1$) and ($m_2$, $s_2$) (i.e. N=3). When the to-be-recognized data ($m_v$, $s_v$) is successfully verified through the minutiae-skeleton verification, the to-be-recognized data ($m_v$, $s_v$) is added to the three-element minutiae-skeleton array. Therefore, the minutiae-skeleton array will then comprises four elements ($m_0$, $s_0$), ($m_1$, $s_1$), ($m_2$, $s_2$) and ($m_v$, $s_v$) (i.e. N=4). Each of the four elements is compared with all of the other three elements respectively through minutiae-skeleton comparison so as to generate three corresponding similarity scores. The three similarity scores are aggregated for each of the four elements. In other words, each of the four elements has an aggregated similarity score. When the aggregated similarity score is higher, it means that the particular element is more similar with the other three elements. Assuming that the aggregated similarity scores for the four elements ($m_0$, $s_0$), ($m_1$, $s_1$), ($m_2$, $s_2$) and ($m_v$, $s_v$) are respectively 15, 12, 20 and 10, then the element ($m_2$, $s_2$) with the highest score (i.e. 20) will be erased from the four-element minutiae-skeleton array. Therefore, the minutiae-skeleton array will then comprise three elements ($m_0$, $s_0$), ($m_1$, $s_1$) and ($m_v$, $s_v$). As a result, the diversity of the updated minutiae-skeleton array will be increased and the coverage of the array will be enlarged.

Figure 11:
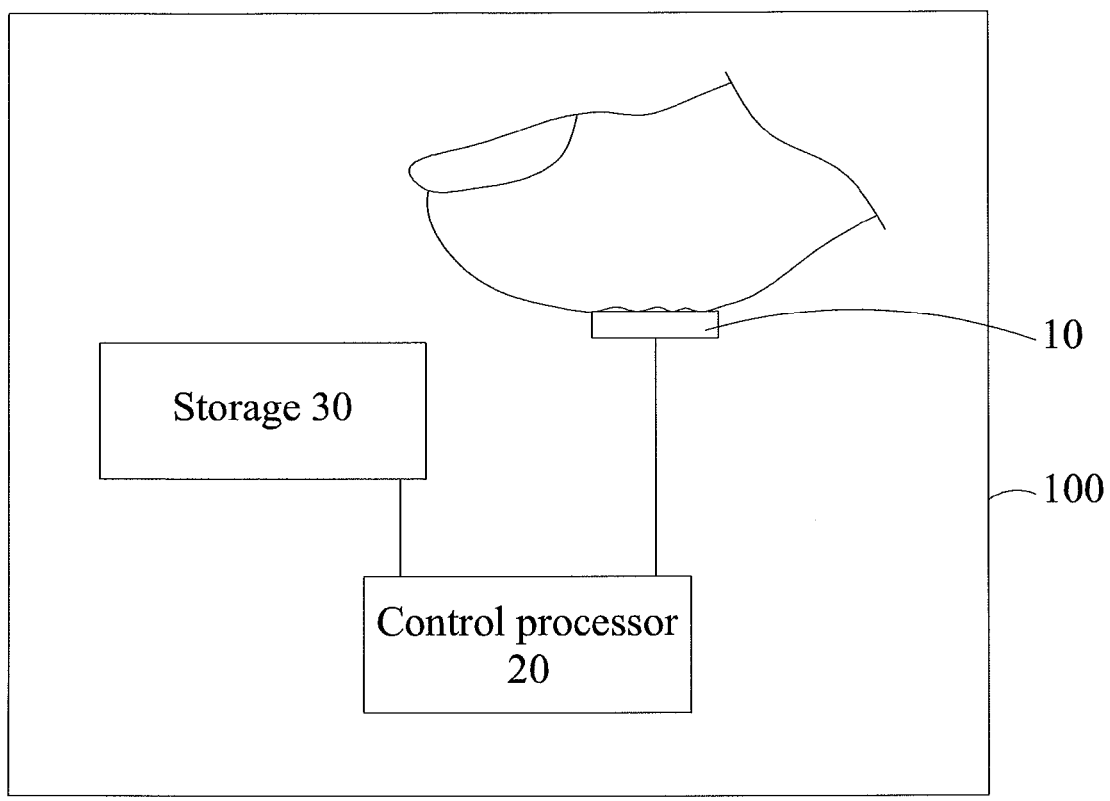
FIG. 11 is a schematic diagram of a fingerprint recognition device according to an embodiment of the present invention.

FIG. 11 is a schematic diagram of a fingerprint recognition device 100 according to an embodiment of the present invention. As shown in the figure, the fingerprint recognition device 100 of the present invention is feasible to be applied in the electronic devices including but not limited to smart phones, tablets, notebooks, electronic cards and so on. The fingerprint recognition device may include a fingerprint sensor 10, a control processor 20 and a storage 30. The control processor 20 is electrically coupled to the fingerprint sensor 10, and the storage 30 is electrically coupled to the control processor 20. The fingerprint sensor 10 may be capacitive, electric field, thermal-sensing or optical-type fingerprint sensor and is able to sense a fingerprint image with 128*128 pixels (about 0.64 cm*0.64 cm), but the present invention shall not be subjected to this restriction. The fingerprint sensor 10 is used to sense a to-be-recognized fingerprint image of a to-be-recognized finger as well as fingerprint images of a registered finger. The control processor 20 is used to execute a fingerprint recognition method of the present invention, and the storage 30 is used to store a merged minutiae data set and a minutiae-skeleton array of a registered finger.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

In conclusion, the present invention provides a fingerprint recognition method and device thereof using a hybrid verification including merged minutiae verification and minutiae-skeleton verification which is applicable to fingerprint verification with a smaller sensing area. The present invention provides reasonable false acceptance rate as well as false rejection rate without the need of storing fingerprint images, and decreases the required storage space. Moreover, the present invention has not been disclosed prior to the filing of the patent application, and the inventiveness and applicability thereof have obviously conformed to provision for being granted for patentability, and the patent application is therefore provided.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A fingerprint recognition method, comprising the following steps:
    (a) obtaining a to-be-recognized fingerprint image of a to-be-recognized finger by a control processor through a fingerprint sensor;
    (b) extracting to-be-recognized data of the to-be-recognized fingerprint image by the control processor, the to-be-recognized data including a to-be-recognized minutiae data set and a to-be-recognized skeleton;
    (c) loading a minutiae-skeleton array of a registered finger from a storage by the control processor, the minutiae-skeleton array including a plurality of elements, each of the plurality of elements including a registered minutiae data set and a registered skeleton, formation of the minutiae-skeleton array comprising the following steps:
        (c1) obtaining n frames of registered fingerprint images of the registered finger by the control processor through the fingerprint sensor, where n is a positive integer greater than or equal to 2;
        (c2) extracting n records of registered minutiae data sets and registered skeletons from the n frames of registered fingerprint images by the control processor; and
        (c3) forming the minutiae-skeleton array comprising the n records of registered minutiae data sets and registered skeletons by the control processor; and
    (d) performing minutiae-skeleton verification on the to-be-recognized data and the minutiae-skeleton array to generate a verification result by the control processor;
    wherein the minutiae-skeleton verification is one-to-many verification between the to-be-recognized data and the plurality of elements included in the minutiae-skeleton array, and when performing the minutiae-skeleton verification, the verification result is determined by whether any one of the plurality of elements included in the minutiae-skeleton array matches the to-be-recognized data.

2. The fingerprint recognition method of claim 1, wherein the step of loading the minutiae-skeleton array of the registered finger further comprises loading a merged minutiae data set of the registered finger defining a set of the registered minutiae data sets of the at least a part of the plurality of elements by the control processor; and the step of generating the verification result further comprises performing minutiae verification on the to-be-recognized minutiae data set of the to-be-recognized data with the merged minutiae data set so as to generate the verification result by the control processor.

3. The fingerprint recognition method of claim 2, wherein formation of the merged minutiae data set comprises the following steps:
    (c1) obtaining n frames of registered fingerprint images of the registered finger by the control processor through the fingerprint sensor, where n is a positive integer greater than or equal to 2;
    (c2) extracting n records of the registered minutiae data sets of the n frames of registered fingerprint images by the control processor; and
    (c3) merging at least two of the n records of the registered minutiae data sets to form the merged minutiae data set by the control processor.

4. The fingerprint recognition method of claim 2, wherein the verification comprises the following steps:
    (d1) performing merged minutiae verification on the to-be-recognized minutiae data set with the merged minutiae data set by the control processor, and defining the to-be-recognized fingerprint image passes the verification if a first verification score is higher than a first threshold value, otherwise performing step (d2); and
    (d2) performing minutiae-skeleton verification on the to-be-recognized data with the minutiae-skeleton array by the control processor, and defining the to-be-recognized fingerprint image passes the verification if a second verification score is higher than a second threshold value, otherwise the verification fails.

5. The fingerprint recognition method of claim 1, wherein the minutiae-skeleton verification comprises minutiae verification and skeleton verification, wherein:
    the minutiae verification is to compare the to-be-recognized minutiae data set with the registered minutiae data set;
    the skeleton verification is dilation matching, the dilation matching is to compare a dilated image of the to-be-recognized skeleton with the registered skeleton; and
    the results of the minutiae verification and the skeleton verification are utilized to generate the verification result.

6. The fingerprint recognition method of claim 5, wherein the dilation matching comprises the following steps:
    (d21) dilating the to-be-recognized skeleton to generate the dilated image by the control processor; and
    (d22) comparing the dilated image with the registered skeleton to determine an amount of overlapping portions by the control processor.

7. The fingerprint recognition method of claim 1, wherein the minutiae-skeleton verification comprises minutiae verification and skeleton verification, wherein:
    the minutiae verification is to compare the to-be-recognized minutiae data set with the registered minutiae data set;
    the skeleton verification is to perform XOR matching on the to-be-recognized skeleton and the registered skeleton; and
    the results of the minutiae verification and the skeleton verification are utilized to generate the verification result.

8. The fingerprint recognition method of claim 7, wherein the XOR matching comprises the following steps:
    (d21) overlapping the to-be-recognized skeleton and the registered skeleton and removing the overlapping parts of the to-be-recognized skeleton and the registered skeleton to generate a XOR diagram by the control processor;
    (d22) removing noise from the XOR diagram by the control processor; and
    (d23) determining a ratio of the removed overlapping parts to the registered skeleton by the control processor.

9. The fingerprint recognition method of claim 1, wherein the step (c2) further comprises preprocessing the n frames of registered fingerprint images to remove sweat pores, and then extracting the n records of registered skeletons by the control processor.

10. The fingerprint recognition method of claim 1, further comprising a learning mechanism comprising:
   re-ordering the plurality of elements of the minutiae-skeleton array according to rates of successful verification by the control processor.

11. The fingerprint recognition method of claim 1, further comprising a learning mechanism comprising: adding the to-be-recognized data passing the minutiae-skeleton verification to the minutiae-skeleton array by the control processor, and deleting the element having the highest similarity with the other elements in the minutiae-skeleton array by the control processor.

12. A fingerprint recognition device, comprising:
   a fingerprint sensor;
   a control processor electrically coupled to the fingerprint sensor, and
   a storage electrically coupled the control processor,
   wherein, the control processor is configured to execute the following steps:
   (a) obtaining a to-be-recognized fingerprint image of a to-be-recognized finger;
   (b) extracting to-be-recognized data of the to-be-recognized fingerprint image, the to-be-recognized data including a to-be-recognized minutiae data set and a to-be-recognized skeleton;
   (c) loading a minutiae-skeleton array of a registered finger, the minutiae-skeleton array including a plurality of elements, each of the plurality of elements including a registered minutiae data set and a registered skeleton, formation of the minutiae-skeleton array comprising the following steps:
      (c1) obtaining n frames of registered fingerprint images of the registered finger by the fingerprint sensor, where n is a positive integer greater than or equal to 2;
      (c2) extracting n records of registered minutiae data sets and registered skeletons from the n frames of registered fingerprint images; and
      (c3) forming the minutiae-skeleton array comprising the n records of registered minutiae data sets and registered skeletons; and
   (d) performing minutiae-skeleton verification on the to-be-recognized data and the minutiae-skeleton array to generate a verification result,
   wherein the minutiae-skeleton verification is one-to-many verification between the to-be-recognized data and the plurality of elements included in the minutiae-skeleton array, and when performing the minutiae-skeleton verification, the verification result is determined by whether any one of the plurality of elements included in the minutiae-skeleton array matches the to-be-recognized data.

13. The fingerprint recognition device of claim 12, wherein in the step of loading the minutiae-skeleton array of the registered finger further comprises loading a merged minutiae data set of the registered finger, the merged minutiae data set is a set of the registered minutiae data sets of the at least a part of the plurality of elements; and in the step of generating the verification result, the control processor is further configured to perform minutiae verification on the to-be-recognized minutiae data set of the to-be-recognized data and the merged minutiae data set so as to generate the verification result.

14. The fingerprint recognition device of claim 13, wherein the control processor is further configured to perform the formation of the merged minutiae data set, with the following steps comprising:
   (c1) obtaining n frames of registered fingerprint images of the registered finger by the fingerprint sensor, where n is a positive integer greater than or equal to 2;
   (c2) extracting n records of the registered minutiae data sets of the n frames registered fingerprint images; and
   (c3) merging at least two of the n records of the registered minutiae data sets to form the merged minutiae data set.

15. The fingerprint recognition device of claim 13, wherein the control processor is further configured to perform the verification, with the following steps comprising:
   (d1) performing merged minutiae verification on the to-be-recognized minutiae data set with the merged minutiae data set, and defining the to-be-recognized fingerprint image passes the verification if a first verification score is higher than a first threshold value, otherwise performing step (d2); and
   (d2) performing minutiae-skeleton verification on the to-be-recognized data with the minutiae-skeleton array, and defining the to-be-recognized fingerprint image passes the verification if a second verification score is higher than a second threshold value, otherwise the verification fails.

16. The fingerprint recognition device of claim 12, wherein the minutiae-skeleton verification comprises minutiae verification and skeleton verification, wherein:
   the minutiae verification is to compare the to-be-recognized minutiae data set with the registered minutiae data set;
   the skeleton verification is dilation matching, the dilation matching is to compare a dilated image of the to-be-recognized skeleton with the registered skeleton; and
   using the results of the minutiae verification and the skeleton verification to generate the verification result.

17. The fingerprint recognition device of claim 16, wherein the control processor is further configured to perform the dilation matching, with the following steps comprising:
   (d21) dilating the to-be-recognized skeleton so as to generate the dilated image; and
   (d22) comparing the dilated image with the registered skeleton to determine an amount of overlapping portions.

18. The fingerprint recognition device of claim 12, wherein the minutiae-skeleton verification comprises minutiae verification and skeleton verification, wherein:
   the minutiae verification is to compare the to-be-recognized minutiae data set with the registered minutiae data set;
   the skeleton verification is to perform XOR matching on the to-be-recognized skeleton and the registered skeleton; and
   the results of the minutiae verification and the skeleton verification are utilized to generate the verification result.

19. The fingerprint recognition device of claim 18, wherein the control processor is further configured to perform the XOR matching, with the following steps comprising:
   (d21) overlapping the to-be-recognized skeleton and the registered skeleton and removing the overlapping parts of the to-be-recognized skeleton and the registered skeleton to generate a XOR diagram;
   (d22) removing noise from the XOR diagram; and
   (d23) determining a ratio of the removed overlapping parts to the registered skeleton.

20. The fingerprint recognition device of claim 12, wherein in the step (c2), the control processor is further configured to preprocessing the n frames of registered fingerprint images to remove sweat pores, and then extracting the n records of registered skeletons.

21. The fingerprint recognition device of claim 12, the control processor is further configured to perform a learning mechanism comprising:

re-ordering the plurality of elements of the minutiae-skeleton array according to rates of successful verification.

22. The fingerprint recognition device of claim 12, the control processor is further configured to perform a learning mechanism, comprising: adding the to-be-recognized data passing the minutiae-skeleton verification to the minutiae-skeleton array, and deleting the element having the highest similarity with the other elements in the minutiae-skeleton array.

\* \* \* \* \*